May 16, 1944.  H. F. FRIMEL  2,349,161
HYDRAULIC PUMP
Filed Aug. 15, 1941  2 Sheets-Sheet 1

Hobart F. Frimel,
INVENTOR

BY
ATTORNEY.

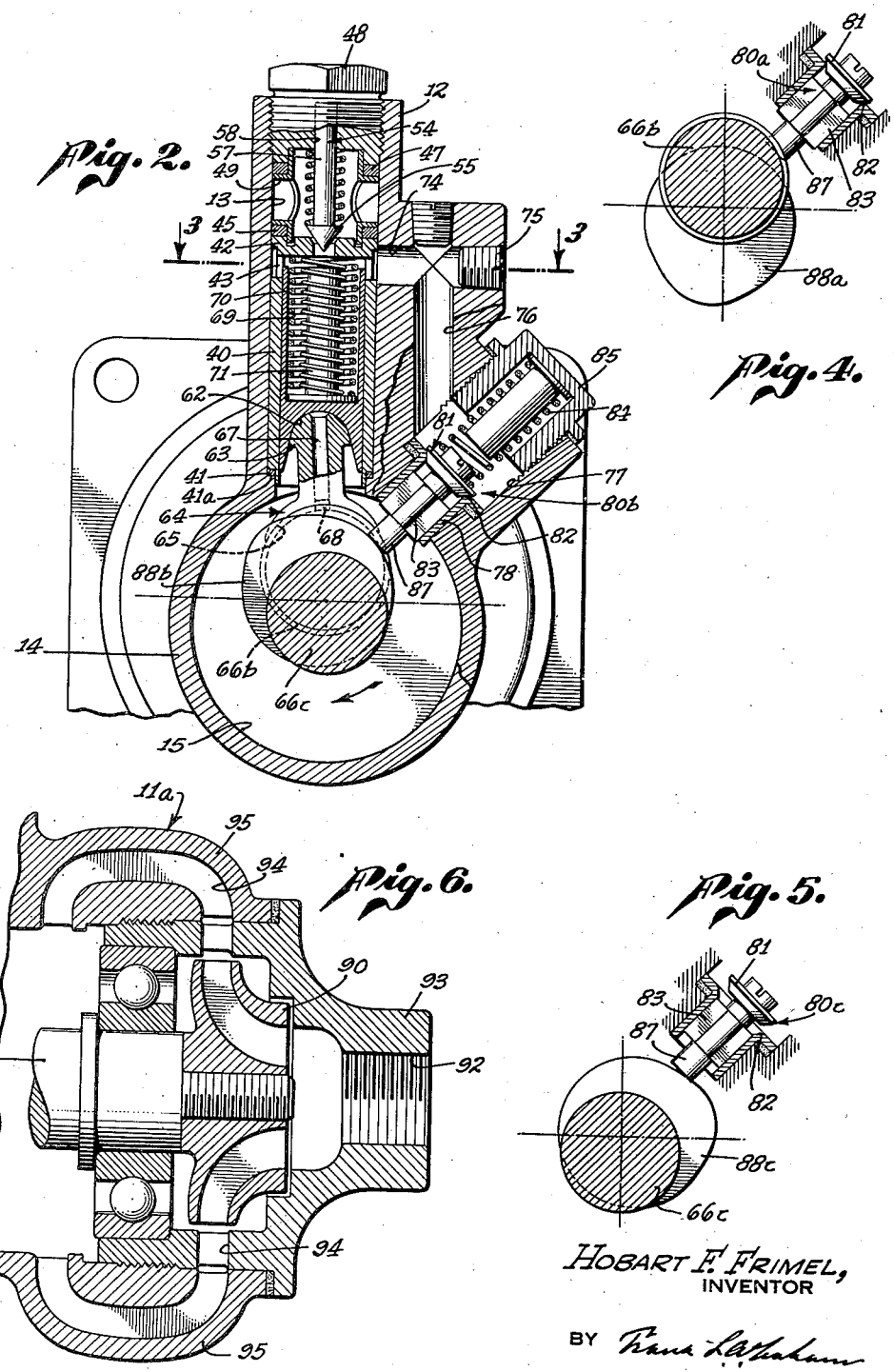

Patented May 16, 1944

2,349,161

UNITED STATES PATENT OFFICE 2,349,161

HYDRAULIC PUMP

Hobart F. Frimel, West Los Angeles, Calif., assignor to Interstate Aircraft and Engineering Corp., a corporation of California Application August 15, 1941, Serial No. 406,958

9 Claims. (Cl. 103—5)

This invention relates generally to hydraulic pumps.

It is a primary object of this invention to provide a hydraulic pump which is particularly designed for use in the hydraulic systems of airplanes although the pump may be useful in other installations where a pressure liquid is used.

In present day aircraft construction it is common practice to provide hydraulic means for operating several parts of the airplanes, namely retractable landing gear and wing flaps, for example. The recent tendency to increase the size of aircraft has made it necessary to provide means for producing higher hydraulic pressures in the hydraulic systems so that the pistons, cylinders, conduits and fittings can be kept as small as possible in order to keep the weight of the parts at a minimum and preclude their taking up any more space than absolutely necessary. Many of the present pumps are not satisfactory for working pressures of over 1,500 lbs. per square inch and it is therefore a particular object of this invention to provide a hydraulic pump which is suitable for use in delivering liquid at higher pressures, especially one which is suitable for a hydraulic system which utilizes hydraulic pressures considerably in excess of 1,500 lbs. to the square inch. In this connection it is an object of the invention to provide a pump which can be driven by the airplane engine through suitable gearing.

It is a further object to provide a positive displacement pump which will deliver liquid at a high pressure with an unobjectionable minimum of pulsations.

It is also an object of this invention to provide a piston type pump in which the construction of the piston makes it unnecessary to provide a flexible or yieldable packing or piston ring between the pistons and cylinders. It is a further object to provide a new and improved means for operating the pistons by a crank shaft without the use of the ordinary connecting rods.

It is another object of the invention to provide positive means for opening the intake valves of the pump and to provide means for delivering the liquid to be pumped to the intake valves and intake passages at a pressure about atmospheric pressure.

These and other objects will be apparent from the drawings and the following description thereof.

Referring to the drawings which are for illustrative purposes only—

Fig. 2 is a cross section taken on line 2—2 of Fig. 1, the view being in two planes;

Fig. 4 is a cross section of the crank shaft showing one intake valve with relation to its particular cam section of the shaft taken on line 4—4 of Fig. 1;

Fig. 5 is a cross section of the crank shaft showing another intake valve with relation to its particular cam section of the shaft taken on line 5—5 of Fig. 1; and Fig. 6 is a longitudinal cross section in the same plane as Fig. 1 of an end of the crank case showing another form of construction.

Figure 1:
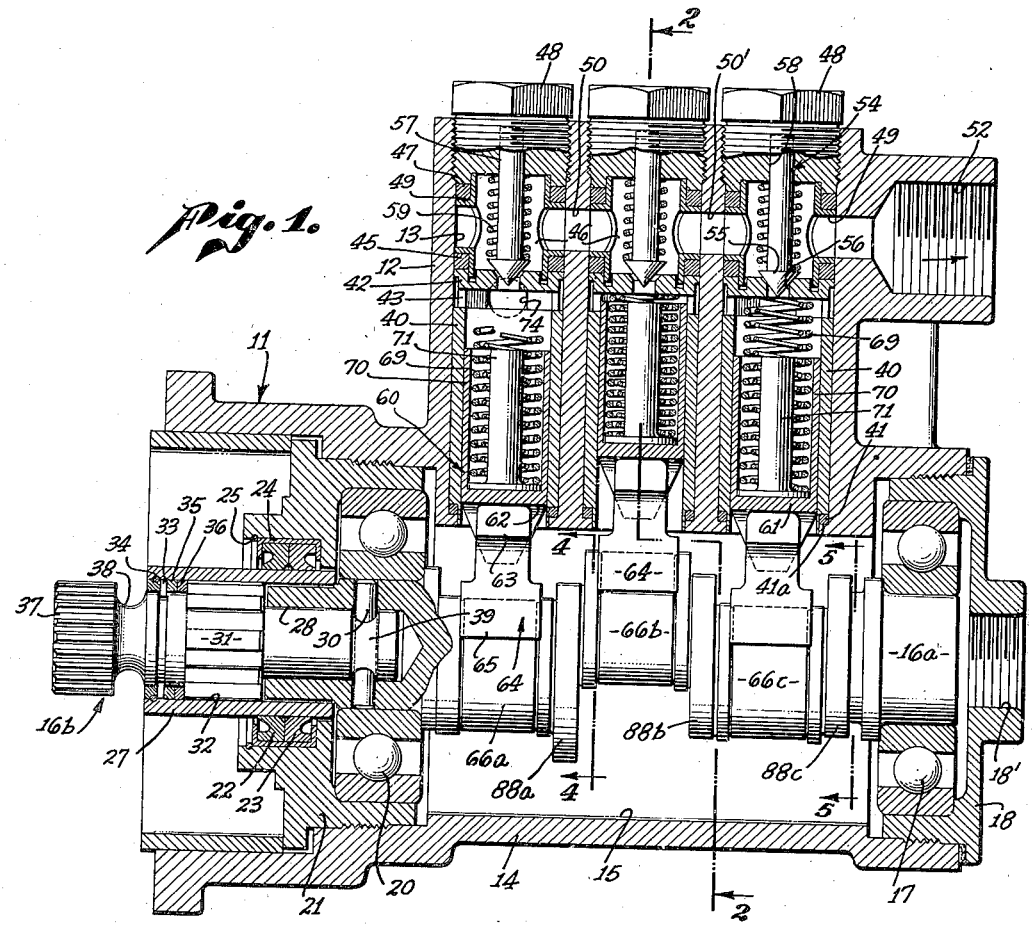
Fig. 1 is a central longitudinal section of a pump embodying the invention.
Figure 3:
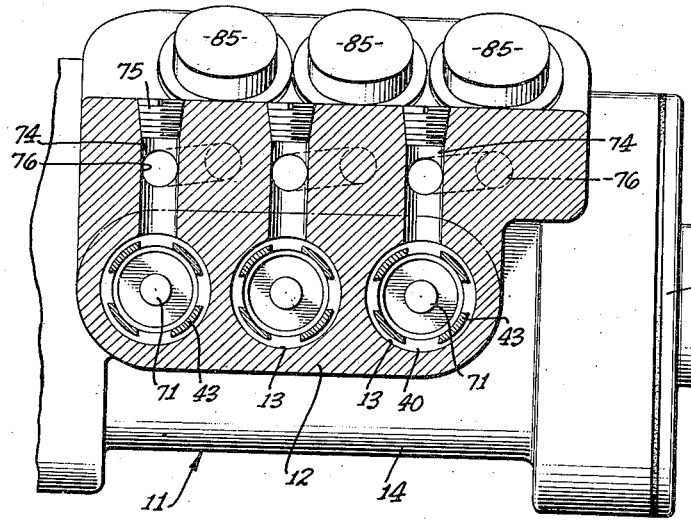
Fig. 3 is a sectional plan view on line 3—3 of Fig. 2, the compression springs having been omitted.

More particularly describing the invention, reference numeral 11 generally indicates a cylinder block and crank case housing. This housing is provided with a cylinder block portion 12 having three cylindrical bores or cylinders 13. The lower part of the housing 14 forms a crank case and provides the crank case chamber 15 adapted to receive the liquid to be pumped. Mounted in the housing is a crank shaft 16 which is supported at one end by the bearing 17 positioned within the end plate 18. The end plate has a liquid inlet opening 18'. At its opposite end the crank shaft is supported on bearing 20 mounted within an end plate 21. The end plate 21 carries two oppositely disposed packing rings 22 disposed within an annular channel 23 which is held in a recess 24 of the plate by a suitable retainer ring 25. The packing rings engage a sleeve 27 mounted on the crank shaft and rotatable therewith.

The crank shaft itself is formed of a crank shaft part 16a and pinion 16b. The pinion is received within a recess 28 in the end of the shaft 16a and secured thereto by means of a pin 30. Beyond the portion of the pinion received in the recess 28 the pin is provided with splines 31 receivable in corresponding splines 32 in the aforementioned sleeve 27. Two half washers 33, one of which is shown on the drawing, are mounted in a groove in the pinion. These washers and retaining ring 34 serve to secure the sleeve on the pinion. A half washer 35 and washer 36 are also provided.

The outer end of the pinion 16b is provided with gear teeth 37 for engagement with a suitable train of gears connected to the engine of the aircraft or other suitable motive power. The crank shaft is made in two parts so as to provide for the possibility of the pump becoming frozen or broken in some manner which would prevent the normal rotation of the shaft 16 with resultant possible damage to the driving engine as, for example, the engine of an aircraft. The pinion is thus provided with two weakened sections, namely the weakened portion in the region of the annular groove 38 and the weakened part in the region of the annular groove 39 where the pin 30 connects the two shaft sections. With this construction if some of the parts of the pump become jammed so that the shaft will not rotate in the normal manner, either the shaft or coupling pin will break without causing injury to the driving engine.

The cylinders 13 are each provided with a liner 40 which seats upon a washer 41 on a ledge 41a. A valve seat 42 is located above each liner, the valve seats having legs 43 which rest on the top of the liner. Above the seat is positioned a washer 45 of neoprene or other suitable material and resting on the washer is a valve retainer or cage 46. Another washer, indicated by 47 is mounted above the cage and the entire assembly is held in place by means of the plug 48 threadably mounted in the top of the cylinder, such plug forming a top closure for the cylinder.

The valve cages 46 are cylindrical in shape except for the transverse tubular extensions 49 providing fluid passages through the sides of the cages. This construction of the cages together with ports 50 and 50' establishes communication between the upper ends of the cylinders above the valve seats with the pump outlet 52. Communication between the outlet 52 and the individual cylinders is controlled by means of the upwardly opening exhaust check valves 54 provided with conical valve heads 55 adapted to control openings 56 through the valve seats 44. Valve stems 57 of the valves are received within cofitting valve guide recesses 58 in the plugs 48. Compression springs 57 are interposed between the valve heads and the plugs 48, serving to yieldably urge the valves to a seated or closed position.

Mounted in each of the sleeves 40 of the cylinders is a piston 60. Each piston has a base portion 61 provided with a concave recess 62 (see Fig. 2) adapted to receive a convex head 63 of a connecting block 64 interposed between the piston and a crank section of the crank shaft. The blocks 64 are provided with concave bases 65 to fit over the respective crank sections 66a, 66b, 66c of the shaft. For the purpose of lubrication a central passage 67 connects with a lateral extending groove 68 in the base.

Since the connecting blocks 64 are only effective for imparting movement of the crank sections to the pistons in a direction away from the shaft, means are provided for urging the pistons toward the shaft and in the form of the invention shown comprises a double spring means generally indicated by numeral 69, the springs in each case being interposed between the valve seat 44 and the base 61 of the piston. The major portion of the spring means is positioned within an annular space formed by an extended circular wall section 70 of the piston and a centrally extending post 71. The elongate side extension wall 70 of each piston provides a long sealing surface between the piston and the sleeves in which they reciprocate thereby eliminating the necessity of piston rings or other seals. The post also serves to reduce the interior volume of the effective cylinder space and to act as a guide for the spring means.

The pump of this invention is designed for pumping a liquid, such as oil, which can be used as a lubricant for the pump. Thus the pump intake 18' leads directly into the crank case which acts as a small reservoir for the liquid prior to its being pumped. Suitable means are provided for permitting the passage of the liquid to be pumped from the crank case chamber 15 to the individual cylinders 13. This means includes the passages 74 communicating with the individual cylinders and closed at their outer ends by plugs 75. Inclined passages 76 connect these passages 74 with inclined bores 77 in the housing. The bores 77 terminate in reduced bores 78 leading directly to the interior of the crank case chamber. In order to positively control the inlet passages, inlet valves 80a, 80b and 80c are provided which each include a valve head 81 provided with a conical surface adapted to engage a valve insert or seat 82. Slidable in the insert is a valve guide member 83 on the valve. Each of the valves is yieldably maintained on its seat by a compression spring 84 partially mounted within a plug 85 closing the bore 77.

Each inlet valve is provided with a lifter stem 87 adapted for engagement with a cam section on the crank shaft. The middle cam section is indicated by numeral 88b and is shown in Fig. 2. With the parts in the position shown in the drawings the central piston is at the limit of its upward stroke as shown in Figs. 1 and 2. When in this position the outlet valve 54 is open and the inlet valve closed. As the crank shaft rotates in the direction of the arrow of Fig. 2, it is apparent that the cam section 88 will serve to open the valve 80b. The relative positions of the other two valves with relation to the positions of their respective pistons is shown in Figs. 4 and 5. In Fig. 4 reference numeral 80a indicates the valve which controls the inlet passage to the cylinder shown at the left of the drawing in Fig. 1 and since the piston in this cylinder is in the course of its upward or compression and exhaust stroke, the valve is closed. Fig. 5 illustrates the relative position of inlet valve 80c which controls the inlet passage to the cylinder shown at the right of the drawing in Fig. 1, and since the piston in this cylinder is in the course of downward movement, or making the suction stroke, this inlet valve is open.

It is a feature of this invention that the inlet passages to the respective cylinders are located at the periphery of the crank chamber where there is a degree of pressure built up by the centrifugal force of the rotation of the liquid in the crank chamber 15 by the action of the rotating crank shaft. The fluid inlet to the chamber 15 indicated by numeral 18' is preferably located substantially in alignment with the axis of the shaft to take advantage of the fact that the pressure will be less in this region than near the periphery.

Where the pump is operated at high speeds it is desirable to supercharge the liquid in the crank case in order to positively supply the liquid to the cylinders and insure a full charge of liquid being supplied the cylinders on the intake strokes of the pistons thereby making it unnecessary to rely upon the suction produced in the cylinders to accomplish this. Accordingly in Fig. 6 there has been shown in a fragmentary sectional view of the end of the crank case and cylinder block housing 11a means for accomplishing this. This means comprises a centrifugal impeller of ordinary design indicated by numeral 90 which is mounted on the end of the crank shaft 91 in any suitable way. This impeller is adapted to rotate with the shaft and create a suction in the inlet 92 of an end housing member 93 and deliver liquid to the interior of the crank case chamber under pressure through passages 94 formed in an enlarged part of the housing 95 and the end housing member 93. It has been found that the combination of the reciprocating pump pistons with means for supercharging the liquid supplied to them makes possible a high speed pump which will deliver liquid at high pressures when used in a high pressure system.

It may also be pointed out that it is desirable to reduce the angle between the connecting blocks and the pistons on the compression stroke and thereby reduce wear between the pistons and cylinders. This is accomplished by offsetting the crank shaft so that it is not directly in the plane of the longitudinal axes of the cylinders. This has been shown in the drawings where the crank shaft is located to the right of the center of the cylinders as viewed in Fig. 2. The inlet valves are also positioned in a plane to one side of the longitudinal axis of the shaft.

It is contemplated that various modifications and changes can be made in the invention as shown and described without departing from the scope of the invention and it is intended to cover such changes and modifications as come within the scope of the claims.

I claim as my invention:

1. In a pump, a housing having a plurality of cylinders and a crank case chamber and having an inlet communicating with said crank case chamber, said housing having exhaust passages for said cylinders, valves controlling said exhaust passages, pistons in said cylinders, a crank shaft in said housing, means for operating the pistons by rotation of said shaft, means providing liquid intake passages connecting each cylinder with said crank case chamber, valves controlling said inlet passages, and means for raising the pressure of the liquid in said crank case chamber above atmospheric.

2. In a pump, a housing having a plurality of cylinders and a crank case chamber having an inlet communicating with said crank case chamber, said housing having exhaust passages for said cylinders, valves controlling said exhaust passages, pistons in said cylinders, a crank shaft in said housing, means for operating the pistons by rotation of said shaft, means providing liquid intake passages connecting each cylinder with said crank case chamber, and an impeller operable by said shaft and positioned intermediate the inlet and said crank case chamber for drawing liquid through said inlet and delivering it to the crank case chamber under pressure.

3. In a pump, a cylinder block and crank case housing having a plurality of cylinders and a crank case chamber, pistons in said cylinders, a crank shaft in said housing, means interposed between the individual pistons and the crank sections of the crank shaft for imparting movement to said pistons through rotation of the shaft, means yieldably urging each piston toward said crank shaft, said housing having passages connecting each of said cylinders with the crank case chamber, and valve means controlling each of said passages.

4. In a pump, a cylinder block and crank case housing having a plurality of cylinders and a crank case chamber; pistons in said cylinders; a crank shaft in said housing; connecting blocks interposed between the respective pistons and the crank shaft; spring means associated with each piston yieldably urging the pistons toward the crank shaft, said housing having a liquid inlet at one end thereof spaced inwardly of the sides of the housing; said housing having inlet passages leading from the periphery of the crank case chamber to the respective cylinders; and valve means for controlling said passages.

5. In a pump, a cylinder block and a crank case housing having a plurality of cylinders and a crank case chamber, pistons in said cylinders, a crank shaft in said housing, means interposed between the individual pistons and the crank sections of the crank shaft for imparting movement to said pistons upon rotation of the shaft, means yieldably urging each piston toward said crank shaft, said housing having passages connecting each of said cylinders with the crank case chamber; cam sections on said crank shaft; and intake valves in each of said passages engageable with and operable by said cam sections upon rotation of the shaft.

6. In a pump, a cylinder block and crank case housing having a plurality of cylinders and a crank chamber, pistons in said cylinders, a crank shaft mounted in said housing, floating connecting blocks interposed between the crank sections of said shaft and the respective pistons, means in each of said cylinders forming an abutment located beyond the stroke of said piston, and coil spring means interposed between each of said pistons and the respective abutments.

7. In a pump, a cylinder block and crank case housing having a plurality of cylinders and a crank case chamber, liner sleeves in said cylinders, valve seats in said cylinders beyond said sleeves, pistons in each cylinder operable within the sleeves, said pistons each having elongate cylindrical wall sections engageable with the respective sleeves, a crank shaft mounted in said housing, floating connecting blocks between the crank sections of the crank shaft and the respective pistons, and compression springs interposed between the respective pistons and their associated valve seats.

8. In a pump a housing having a plurality of cylinders and a crank case chamber, pistons in said cylinders, a crank shaft in said housing, connecting blocks interposed between the individual pistons and the crank sections of the crank shaft, said housing having outlet passages connecting with the ends of said cylinders opposite to the crank case ends, a valve seat in each cylinder beyond the stroke of the piston, a check valve cooperating with each seat, compression springs between each seat and the piston in the respective cylinder yieldably urging the respective pistons toward the crank shaft, said housing having passages providing communication between the interior of the crank case chamber and each of the cylinders at a point below the said check valves, an inlet valve member in each of said last mentioned passages including a stem projecting toward said crank shaft, cam sections on said shaft engageable by said valve stems for operating said inlet valves, and means for introducing liquid to be pumped into said crank case chamber.

9. In a pump, a cylinder block and crank case housing having cylinders therein, pistons in said cylinders, a crank shaft mounted in said housing, floating connecting blocks interposed between the crank sections of the shaft and the respective pistons, said blocks being provided with a concave crank engaging surface adapted to extend only part way around the crank surface and a convex piston engaging surface curved around a line parallel to the axis of said shaft when said block is positioned against a crank surface of said shaft, said pistons being provided with concave recesses for the reception of the respective convex piston engaging surfaces of said blocks, and means yieldably urging said pistons toward said shaft.

HOBART F. FRIMEL.